United States Patent
Oon et al.

(10) Patent No.: US 7,435,962 B2
(45) Date of Patent: Oct. 14, 2008

(54) IMAGING DEVICE AND METHOD FOR PRODUCING AN INFRARED FILTERED DIGITAL IMAGE

(75) Inventors: Chin Hin Oon, Penang (MY); Kean Loo Keh, Penang (MY); Farn Hin Chen, Perak (MY); Eit Thian Yap, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 151 days.

(21) Appl. No.: 11/134,208

(22) Filed: May 18, 2005

(65) Prior Publication Data

US 2006/0261280 A1    Nov. 23, 2006

(51) Int. Cl.
*G01J 5/02* (2006.01)
*G06K 9/00* (2006.01)

(52) U.S. Cl. .................................. 250/341.8; 382/163
(58) Field of Classification Search ............ 250/370.08, 250/370.06, 340, 341.8; 382/163
See application file for complete search history.

(56) References Cited

U.S. PATENT DOCUMENTS

| | | | |
|---|---|---|---|
| 4,651,001 A * | 3/1987 | Harada et al. | 250/330 |
| 4,996,427 A * | 2/1991 | Noble et al. | 250/332 |
| 5,903,712 A * | 5/1999 | Wang et al. | 358/1.9 |
| 6,107,618 A * | 8/2000 | Fossum et al. | 250/208.1 |
| 6,211,521 B1 * | 4/2001 | Bawolek et al. | 250/339.02 |
| 6,486,974 B1 * | 11/2002 | Nakai et al. | 358/1.9 |
| 6,657,663 B2 * | 12/2003 | Morris | 348/273 |
| 6,853,005 B2 | 2/2005 | Ikeda | |
| 7,079,230 B1 * | 7/2006 | McInerney et al. | 356/71 |
| 7,170,046 B2 * | 1/2007 | Higashitsutsumi | 250/226 |
| 2006/0188155 A1 * | 8/2006 | Matsuyama | 382/167 |

\* cited by examiner

*Primary Examiner*—David P. Porta
*Assistant Examiner*—Carolyn Igyarto

(57) ABSTRACT

An imaging device and method for producing an infrared (IR) filtered digital image of a scene of interest uses IR image signals derived from light transmitted through infrared pass filters of a color filter array to remove IR light components of color image signals derived from light transmitted through color pass filters of the color filter array. The color and IR image signals are generated using an image sensor that includes an imaging array and the color filter array.

13 Claims, 4 Drawing Sheets

IMAGING DEVICE AND METHOD FOR PRODUCING AN INFRARED FILTERED DIGITAL IMAGE

BACKGROUND OF THE INVENTION

Infrared (IR) light can cause distortions in images captured by an IR sensitive digital camera. As an example, since high temperature sources produce IR light, color distortions may appear in captured images of a scene of interest that includes one or more high temperature sources. Thus, in certain conditions, it is desirable to filter out IR light so that IR distortions can be reduced in the captured images.

However, IR light is sometimes used to provide illumination in low lighting conditions when a conventional flash of light is inappropriate. Thus, some digital cameras include one or more IR light emitting diodes ("LEDs") to produce IR light in addition to a conventional flash. When using IR light for illumination, it is obviously not desirable to filter out IR light.

Since IR light filtering is desired in certain conditions and not in others, a removable IR filter is commonly used to selectively filter IR light. The removable IR filter is designed to fit over the lens of a digital camera to block IR light so that IR light does not reach the image sensor of the camera. When using IR light for illumination, the removable IR filter is removed to allow IR light to be transmitted to the image sensor.

A concern with the use of a removable IR filter is that a digital camera must be designed to accommodate the removable IR filter, which may be difficult for some camera types such as a camera phone. Furthermore, the accommodation of the removable IR filter may inhibit development of more compact digital cameras. Another concern is that a removable IR filter may be difficult to remove from the digital camera in dark conditions, and may be lost when removed from the camera.

In view of these concerns, there is a need for an IR sensitive digital camera and method for producing IR filtered digital image of a scene of interest without the use of a removable IR filter.

SUMMARY OF THE INVENTION

An imaging device and method for producing an infrared (IR) filtered digital image of a scene of interest uses IR image signals derived from light transmitted through infrared pass filters of a color filter array to remove IR light components of color image signals derived from light transmitted through color pass filters of the color filter array. The color and IR image signals are generated using an image sensor that includes an imaging array and the color filter array. The IR light components of the color image signals may be removed by subtracting a particular IR image signal from each of the color image signals that correspond to that particular IR image signal.

An image sensor in accordance with an embodiment of the invention comprises an imaging array and a color filter array (CFA). The imaging array includes photosensitive elements. The CFA includes color and IR pass filters. The CFA is positioned over the imaging array such that each of the color and infrared pass filters is positioned over one of the photosensitive elements. Each of the color pass filters is configured to transmit a particular color light and IR light. Each of the IR pass filters is configured to transmit IR light.

An imaging device in accordance with an embodiment of the invention comprises an image sensor and a processor. The image sensor includes an imaging array and a CFA. The imaging array includes first and second photosensitive elements. The CFA includes color and IR pass filters. The CFA is positioned over the imaging array such that each of the color pass filters is positioned over one of the first photosensitive elements and each of the IR pass filters is positioned over one of the second photosensitive elements. The first photosensitive elements generate color image signals with IR light components in response to light received through the color pass filters. The second photosensitive elements generate IR image signals in response to light received through the IR pass filters. The processor is operatively connected to the image sensor to receive the first and second image signals from the first and second photosensitive elements. The processor is configured to selectively process the first and second image signals to remove the IR light components from the first image signals to produce an IR filtered image.

A method for producing an IR filtered digital image of a scene of interest in accordance with an embodiment of the invention comprises transmitting light from the scene of interest through a color filter array including color and IR pass filters, generating first image signals with IR light components in response to the light transmitted through the color pass filters, generating second image signals in response to the light transmitted through the IR pass filters, and processing the first and second image signals to remove the IR light components from the first image signals to produce the IR filtered digital image.

Other aspects and advantages of the present invention will become apparent from the following detailed description, taken in conjunction with the accompanying drawings, illustrated by way of example of the principles of the invention.

DETAILED DESCRIPTION

Figure 1:
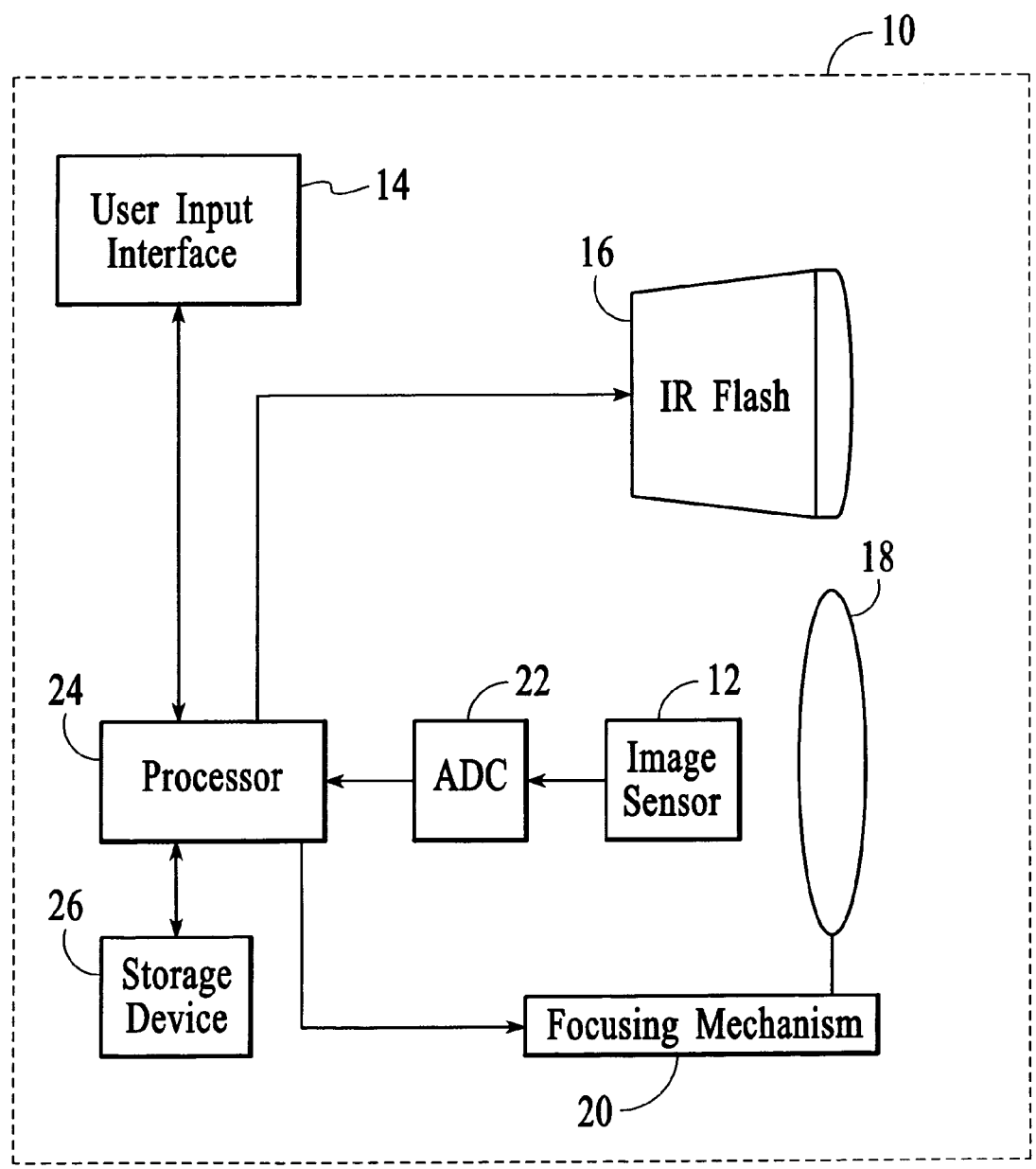
FIG. 1 is a block diagram of a digital imaging device in accordance with an embodiment of the invention.

With reference to FIG. 1, a digital imaging device 10 in accordance with an embodiment of the invention is described. The digital imaging device 10 may be any type of a digital imaging device, such as a digital camera, a digital video camera or a camera phone. As described in more detail below, the digital imaging device 10 uses an image sensor 12 that is designed to discriminate infrared (IR) light from visible color lights. If IR light filtering is desired, the detected IR light can be used to selectively remove IR light components from captured signals related to the visible color lights to produce an IR filtered digital image. If IR light filtering is not desired, the detected IR light can be ignored to produce a digital image from the captured signals related to the visible color lights, which will include IR light components. Thus, the digital imaging device 10 can selectively filter IR light to produce desired digital images of scenes of interest without the need for a removable IR filter.

As shown in FIG. 1, the imaging device 10 includes a user input interface 14, an IR flash 16, a lens 18, a focusing mechanism 20, the image sensor 12, an analog-to-digital converter (ADC) 22, a processor 24 and a storage device 26. The user input interface 14 allows a user to input commands and/or selections into the imaging device 10. The user input interface 14 may include any type of input devices, such as buttons, dials, levers, switches and a touch screen display with graphical controls. The IR flash 16 operates to produce a flash of IR light to provide illumination during low lighting conditions. The IR flash 16 may be an integrated component of the imaging device 10. Alternatively, the IR flash 16 may be an external device that can be attached to the imaging device 10 when needed. The IR flash 16 can be set using the user input interface 14 to be automatically activated by the processor 24 when capturing an image.

The lens 18 is used to focus a scene of interest onto the image sensor 12 to capture an image of that scene. The focusing mechanism 20 operates to move the lens 18 to focus the lens with respect to the scene of interest. The focusing mechanism 20 can be controlled manually using the user input interface 14 or automatically by the processor 24.

Figure 2:
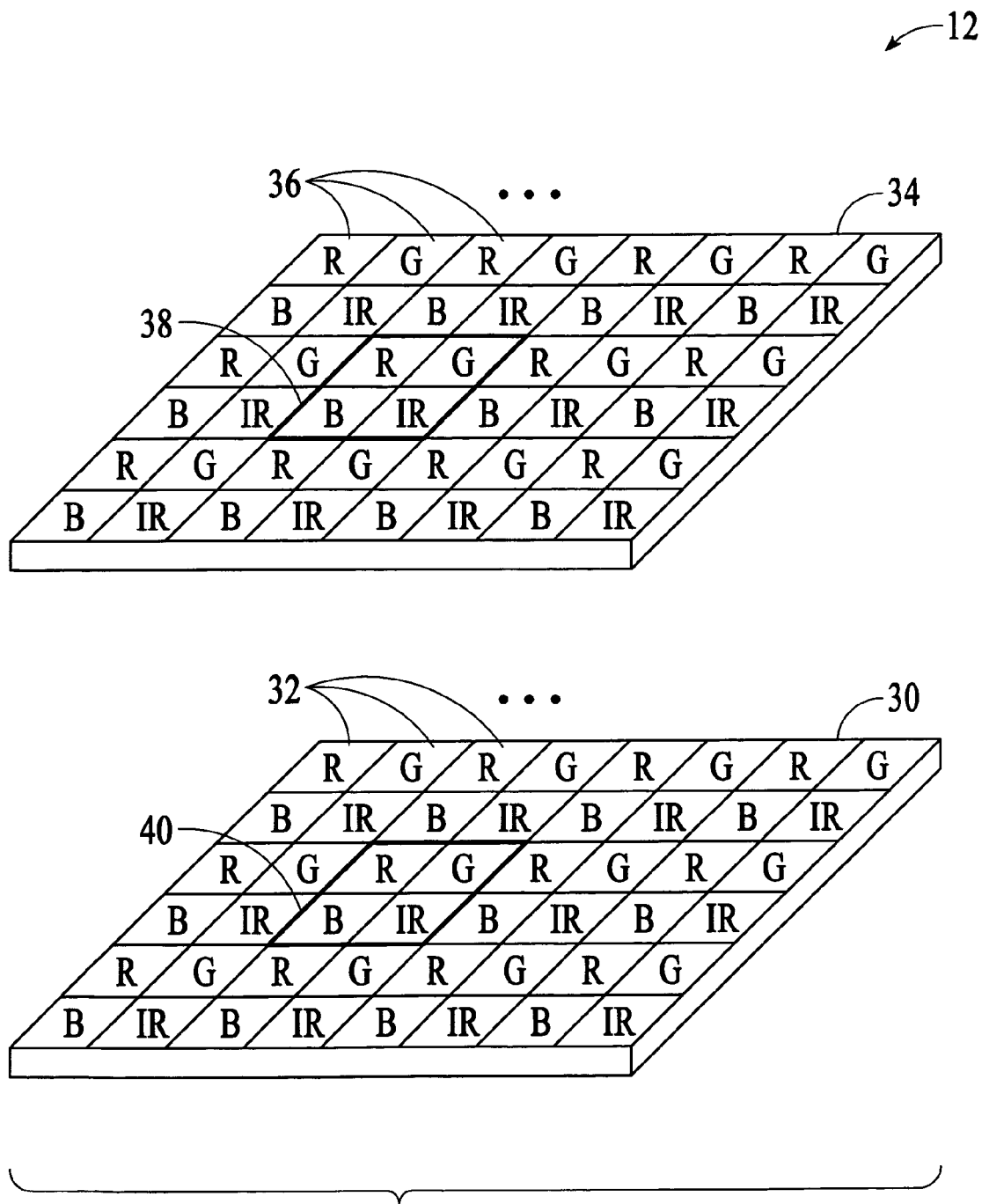
FIG. 2 is an exploded view of an image sensor in accordance with an embodiment of the invention, which may be included in the digital imaging device of FIG. 1.

The image sensor 12 is configured to electronically capture the focused image by generating image signals in the form of electrical charges in response to impinging light at different photosensitive locations on the image sensor. As shown in FIG. 2, which is an exploded view of the image sensor 12, the image sensor includes an imaging array 30 of photosensitive elements 32 and a color filtering array (CFA) 34. Each photosensitive element 32 of the imaging array 30 accumulates an electrical charge when light is impinging upon that element, thereby producing an analog image signal. Thus, the photosensitive elements 32 of the imaging array 30 can be considered to be photosensitive locations or pixels of the image sensor 12. As an example, the imaging array 30 may be a charged coupled device (CCD) array or a complementary metal-oxide semiconductor (CMOS) array. The CFA 34 includes color and IR pass filters 36 that are arranged in a predefined pattern. The CFA 34 is positioned over the imaging array 30 and faces the lens 18 to selectively transmit certain light to the photosensitive elements 32 of the imaging array. Thus, the light that impinges upon each photosensitive element 32 of the imaging array 30 depends on the filter 36 of CFA 34 that is positioned over that photosensitive element.

In the illustrated embodiment, the CFA 34 includes red (R), green (G), blue (B) and IR pass filters 36. Since each pass filter 36 of the CFA 34 is positioned over a particular photosensitive element 32 of the imaging array 30, each photosensitive element will sometimes be referred to herein as R, G, B or IR photosensitive element, depending on the pass filter positioned over that photosensitive element. The R pass filters 36 allow red color light to be transmitted. Similarly, the G and B pass filters 36 allow green and blue light, respectively, to be transmitted. In addition to the respective color light, each of these color pass filters 36 also allows IR light to be transmitted. Thus, the light received by the R photosensitive elements 32 includes both R and IR light components, which are reflected in the analog image signals ("$R_o$") generated by the R photosensitive elements. Similarly, the light received by the G photosensitive elements 32 includes both G and IR light components, which are reflected in the analog image signals ("$G_o$") generated by the G photosensitive elements, and the light received by the B photosensitive elements 32 includes both B and IR light components, which are reflected in the analog image signals ("$B_o$") generated by the B photosensitive elements. The IR pass filters 36 allow only IR light to be transmitted. Thus, the light received by the IR photosensitive elements 32 includes only IR light components, which are reflected in the analog image signals ("$IR_o$") generated by the IR photosensitive elements. The $R_o$, $G_o$, $B_o$ and $IR_o$ signals can be mathematically expressed as follows:

$$R_o = R + IR,$$

$$G_o = G + IR,$$

$$B_o = B + IR, \text{ and}$$

$IR_o = IR$, where R, G, B and IR represent red, green, blue and infrared light components, respectively.

In an embodiment, the R, G, B and IR pass filters 36 are arranged such that the R and G pass filters are positioned in an alternating fashion on every other row of the CFA 34 and the B and IR pass filters are positioned in an alternating fashion on the remaining rows of the CFA, as illustrated in FIG. 2. Furthermore, the R, G, B and IR pass filters 36 are arranged such that the R and B pass filters are positioned in an alternating fashion on every other column of the CFA 34 and the G and IR pass filters are positioned in an alternating fashion on the remaining columns of the CFA. The R, G, B and IR pass filters 36 can be grouped in 2×2 filter blocks, as illustrated by a 2×2 filter block 38 in FIG. 2. In an embodiment, each 2×2 filter block includes an R pass filter in the upper left quadrant, a G pass filter in the upper right quadrant, a B pass filter in the lower left quadrant and an IR pass filter in the lower right quadrant, as shown by the 2×2 filter block 38. Thus, the R, G, B and IR photosensitive elements 32 of the imaging array 30 can be grouped in the same manner using 2×2 element blocks, as illustrated by a 2×2 element block 40 in FIG. 2. In other embodiments, different arrangements of the R, G, B and IR pass filters 36 are possible.

Turning back to FIG. 1, the $R_o$, $G_o$, $B_o$ and $IR_o$ analog image signals generated by the photosensitive elements 32 of the image sensor 12 in the form of accumulated electrical charges are converted to corresponding digital signals by the ADC 22. The digital signals are then transmitted to the processor 24 for signal processing.

The processor 24 of the imaging device 10 processes the $R_o$, $G_o$, $B_o$ and $IR_o$ digital signals from the ADC 22 to produce a digital image of the captured scene of interest. In an IR filtering mode of operation, the processor 24 removes the IR light components from the $R_o$, $G_o$ and $B_o$ digital signals using the $IR_o$ digital signals to produce an IR filtered digital image. In an embodiment, this is achieved by considering only the $R_o$, $G_o$, $B_o$ and $IR_o$ digital signals derived from a particular 2×2 element block of the imaging array 30, and then subtracting the $IR_o$ digital signal from each of the $R_o$, $G_o$ and $B_o$ digital signals to produce IR filtered R, G and B signals (R', G' and B'). The R', G' and B' signals can be mathematically expressed as follows:

$$R' = R_o - IR_o = R,$$

$$G' = G_o - IR_o = G \text{ and}$$

$$B' = B_o - IR_o = B.$$

In a standard mode of operation (no IR filtering), the processor 24 processes the $R_o$, $G_o$ and $B_o$ digital signals to produce a standard digital image, which has not been IR filtered. In this standard mode of operation, the $IR_o$ digital signals are not needed, and thus, are disregarded by the processor 24. Thus, the resulting digital image is derived from color image signals that include IR light components.

The processes performed by the processor 24 may further include demosaicing, image enhancements and compression. The resulting digital image is stored in the storage device 26, which may include a removable memory card. The processor 24 also controls the various active components of the imaging device 10, such as the IR flash 16, the focusing mechanism 20, the image sensor 12 and the ADC 22. The processor 24 also performs operations commanded by a user through the user input interface 14.

The digital imaging device 10 includes other components that are commonly found in conventional digital cameras, which are not shown or described herein so that the inventive features of the imaging device are not obscured.

An IR filtering mode of operation of the digital imaging device 10 in accordance with an embodiment of the invention is now described in detail with reference to FIGS. 1 and 2. The IR filtering mode of operation is enabled by a user entering a command into the digital imaging device 10 using the user input interface 14. In order to capture a scene of interest, the user points the digital imaging device 10 toward the scene of interest. If the autofocus feature of the imaging device 10 is enabled, the processor 24 automatically focuses the scene of interest by moving the lens 18 using the focusing mechanism 20. If the autofocus feature of the imaging device 10 is not enabled, the user may manually focus the scene of interest by controlling the focusing mechanism 20 to move the lens 18 using the user input interface 14.

When the user enters a command to take a picture using the user input interface 14, the image sensor 12 is activated to generate analog image signals to capture the scene of interest. When the image sensor 12 is activated, each of the photosensitive elements 32 of the imaging array 30 begins to accumulate an electrical charge in response to received light. However, due to the CFA 34 of the image sensor 12, the light received by each of the photosensitive elements 32 depends on the pass filter 36 of the CFA positioned over that photosensitive element. The R photosensitive elements 32 with the R pass filters 36 positioned over them receive $R_o$ light that includes R and IR light components. Similarly, the G photosensitive elements 32 with the G pass filters 36 positioned over them receive $G_o$ light that includes G and IR light components, and the B photosensitive elements with the B pass filters positioned over them receive $B_o$ light that includes B and IR light components. However, the IR photosensitive elements 32 with the IR pass filters 36 positioned over them receive $IR_o$ light that includes only an IR light component. Thus, the $R_o$, $G_o$, $B_o$ and $IR_o$ analog image signals generated by the R, G, B and IR photosensitive elements 32, respectively, in the form of accumulated electrical charges represent different light transmitted through the R, G, B and IR pass filters 36 of the CFA 34.

The $R_o$, $G_o$, $B_o$ and $IR_o$ analog image signals are then converted to $R_o$, $G_o$, $B_o$ and $IR_o$ digital image signals by the ADC 22, and transmitted to the processor 24. The processor 24 then process the $R_o$, $G_o$, $B_o$ and $IR_o$ digital image signals to remove the IR light components from the $R_o$, $G_o$ and $B_o$ signals by subtracting the $IR_o$ signal from the corresponding $R_o$, $G_o$ and $B_o$ signals, which are the $R_o$, $G_o$ and $B_o$ signals from the same 2×2 element block of the imaging array 30 of the image sensor 12 from which the $IR_o$ signal originated. As a result, the processor 24 derives R', G' and B' signals, which represent primary color signals that have been IR filtered. The processor 24 then demosaics or interpolates the R', G' and B' signals to extract the other missing color information for each of the R', G' and B' signals in order to produce an IR filtered color digital image. The R', G' and B' signals may be processed by the processor 24 to enhance the resulting image. The resulting image may then be compressed using a compression technique and stored in the storage device 26.

A standard mode of operation of the imaging device 10 in accordance with an embodiment of the invention is similar to the IR filtering mode of operation. When capturing a scene of interest in the standard mode of operation, $R_o$, $G_o$, $B_o$ and $IR_o$ analog image signals are also produced by the photosensitive elements 32 of the image sensor 12 and converted to $R_o$, $G_o$, $B_o$ and $IR_o$ digital image signals to be processed by the processor 24. However, in the standard mode of operation, the IR flash 16 may be activated to generate a flash of IR light to illuminate the scene of interest. Furthermore, in the standard mode of operation, the IR light components of the $R_o$, $G_o$ and $B_o$ digital signals are not removed using the $IR_o$ digital signals. That is, the $IR_o$ signal is not subtracted from the corresponding $R_o$, $G_o$ and $B_o$ signals. Thus, the resulting image is derived using the original $R_o$, $G_o$ and $B_o$ signals, which include the IR light components. The $IR_o$ signals are not used in the standard mode of operation.

Figure 3:
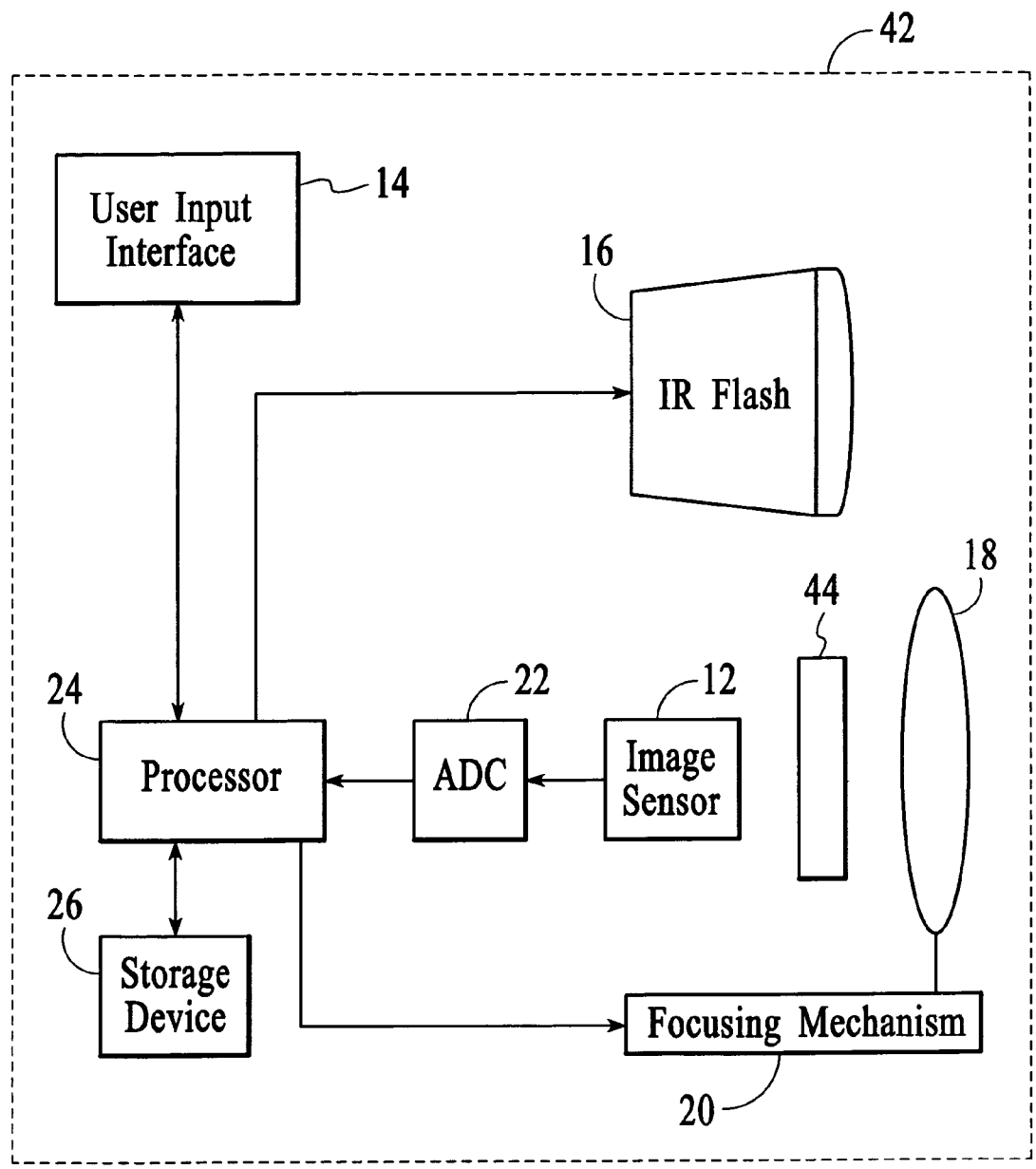
FIG. 3 is a block diagram of a digital imaging device in accordance with an alternative embodiment of the invention

Turning now to FIG. 3, a digital imaging device 42 in accordance with an alternative embodiment of the invention is shown. The digital imaging device 42 is similar to the digital imaging device 10 of FIG. 1, except the digital imaging device 42 includes an IR blocking filter 44. The IR blocking filter 44 is shown in FIG. 3 to be positioned in front of the image sensor 12 between the image sensor and the lens 18. However, in other embodiments, the IR blocking filter 44 may be positioned in front of the lens 18. Alternatively, the IR blocking filter 44 may be incorporated into the image sensor 12. The IR blocking filter 44 is used to block IR light at wavelengths longer than the wavelength of the flash of IR light produced by the IR flash 16. As an example, the IR blocking filter 44 may be configured to block IR light at wavelengths longer than a predefined wavelength, which may be slightly longer than the peak wavelength of the flash of IR light. Thus, the IR blocking filter 44 reduces the amount of IR light impinging upon the image sensor 12, which will increase the accuracy of the image sensor.

Figure 4:
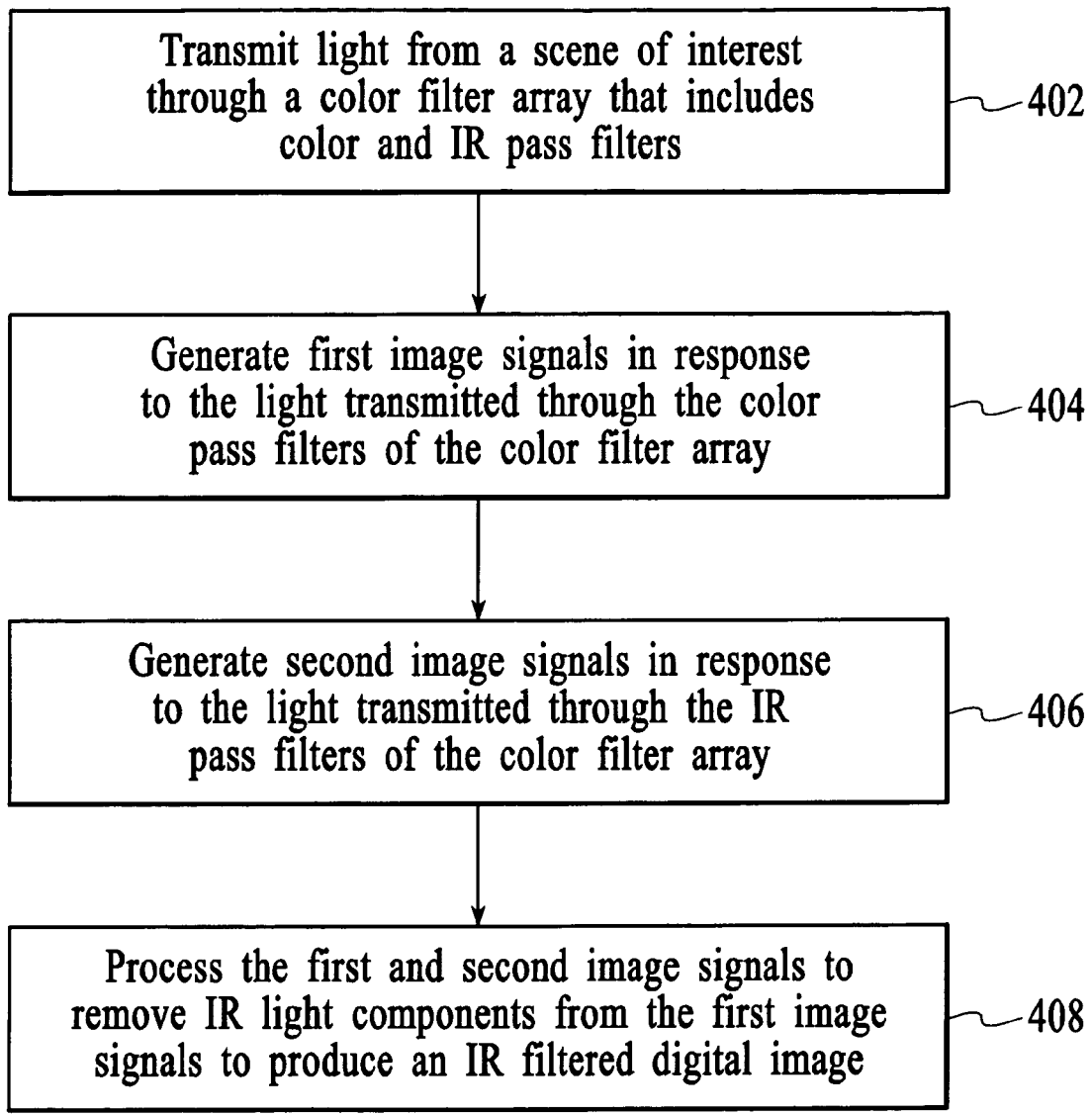
FIG. 4 is a flow diagram of a method for producing an infrared filtered digital image of a scene of interest in accordance with an embodiment of the invention.

A method for producing an IR filtered digital image of a scene of interest in accordance with an embodiment of the invention is described with reference to the flow diagram of FIG. 4. At block 402, light from a scene of interest is transmitted through a color filter array that includes color and IR pass filters. In an embodiment, the color pass filters of the color filter array include R, G and B pass filters. Next, at block 404, first image signals are generated in response to the light transmitted through the color pass filters of the color filter array. The first image signals include both color and IR light components. Next, at block 406, second image signals are generated in response to the light transmitted through the IR pass filters of the color filter array. The generating of the first and second image signals may be performed in parallel. Next, at block 408, the first and second image signals are processed to remove the IR light components from the first image signals to produce the IR filtered digital image.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An imaging system comprising:
  an infrared flash configured to generate a flash of infrared light;
  an image sensor including an imaging array and a color filter array, said imaging array including first and second photosensitive elements, said color filter array including color and infrared pass filters, said color filter array being positioned over said imaging array such that each of said color pass filters is positioned over one of said first photosensitive elements and each of said infrared pass filters is positioned over one of said second photosensitive elements, said first photosensitive elements generating first image signals with infrared light components in response to light received through said color pass filters, said second photosensitive elements generating second image signals in response to light received through said infrared pass filters; and a processor operatively connected to said image sensor to receive said first and second image signals from said first and second photosensitive elements, said processor being configured to selectively process said first and second image signals to remove said infrared components from the first image signals to produce an infrared filtered digital image when said infrared flash is not used, said processor being configured to selectively process said first and second image signals to produce a digital image without said infrared components removed when said infrared flash is used.

2. The imaging device of claim 1 wherein said imaging array of said image sensor is one of a charge-coupled device array and a complementary metal oxide semiconductor array.

3. The imaging device of claim 1 wherein said color pass filters of said color filter array include red, green and blue pass filters.

4. The imaging device of claim 3 wherein said color filter array includes a plurality of 2×2 filter blocks, each one of said 2×2 filter blocks including one red pass filter, one green pass filter, one blue pass filter and one infrared pass filter.

5. The imaging device of claim 4 wherein said processor is configured to remove said infrared components from said first image signals associated with a particular 2×2 filter block of said color filter array using one of said second image signals associated with said particular 2×2 filter block.

6. The imaging device of claim 5 wherein said processor is configured to remove said infrared components from said first image signals associated with said particular 2×2 filter block by subtracting said one of said second image signals associated with said particular 2×2 filter block from said first image signals associated with said particular 2×2 filter block.

7. The imaging device of claim 1 wherein said processor is configured to selectively disregard said second image signals to produce an output digital image that has not been filtered with respect to infrared light using said first image signals.

8. The imaging device of claim 1 further comprising an infrared blocking filter optically coupled to said image sensor, said infrared blocking filter being configured to block infrared light with wavelengths longer than a predefined wavelength, said predefined wavelength being longer than the peak wavelength of said flash of infrared light.

9. A method for producing an infrared filtered digital image of a scene of interest, said method comprising:

transmitting light from said scene of interest through a color filter array including color and infrared pass filters;

generating first image signals with infrared light components in response to said light transmitted through said color pass filters;

generating second image signals in response to said light transmitted through said infrared pass filters;

processing said first and second image signals to remove said infrared light components from the first image signals to produce said infrared filtered digital image;

producing a flash of infrared light to illuminate another scene of interest;

transmitting light from said another scene of interest through said color filter array;

generating image signals in response to said light transmitted through said color and infrared pass filters of said color filter array; and processing said image signals to produce a digital image without removing infrared light components from said image signals.

10. The method of claim 9 wherein said transmitting includes transmitting said light from said scene of interest through red, green and blue pass filters and said infrared pass filters of said color filter array.

11. The method of claim 9 wherein said color filter array includes a plurality of 2×2 filter blocks, each one of said 2×2 filter blocks including three color pass filters and one infrared pass filter, and wherein said processing includes subtracting one of said second image signals associated with a particular 2×2 filter block from said first image signals associated with said particular 2×2 filter block.

12. The method of claim 11 wherein each one of said 2×2 filter blocks includes one red pass filter, one green pass filter, one blue pass filter and one infrared pass filter.

13. The method of claim 9 further comprising blocking infrared light with wavelengths longer than a predefined wavelength, said predefined wavelength being longer than the peak wavelength of said flash of infrared light.

* * * * *